(12) United States Patent
Geng et al.

(10) Patent No.: US 11,604,711 B2
(45) Date of Patent: Mar. 14, 2023

(54) ERROR RECOVERY METHOD AND APPARATUS

(71) Applicant: HUAWEI TECHNOLOGIES CO., LTD., Guangdong (CN)

(72) Inventors: Dongjiu Geng, Shenzhen (CN); Shuo Li, Beijing (CN); Yongxiang Liang, Beijing (CN); Qiangmin Lin, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/376,442

(22) Filed: Jul. 15, 2021

(65) Prior Publication Data

US 2021/0342234 A1 Nov. 4, 2021

Related U.S. Application Data

(63) Continuation of application No. 17/038,428, filed on Sep. 30, 2020, now Pat. No. 11,068,360, which is a continuation of application No. PCT/CN2020/093188, filed on May 29, 2020.

(30) Foreign Application Priority Data

May 31, 2019 (CN) .......................... 201910473113.6

(51) Int. Cl.
*G06F 11/00* (2006.01)
*G06F 11/16* (2006.01)

(52) U.S. Cl.
CPC ...... *G06F 11/1687* (2013.01); *G06F 11/1629* (2013.01); *G06F 11/1641* (2013.01); *G06F 2201/82* (2013.01)

(58) Field of Classification Search
CPC ............. G06F 11/1629; G06F 11/1641; G06F 11/1687; G06F 11/1679; G06F 2201/82
See application file for complete search history.

(56) References Cited

U.S. PATENT DOCUMENTS

| 5,905,857 | A | 5/1999 | Buzby et al. |
| 5,915,082 | A * | 6/1999 | Marshall ................ G06F 11/10 714/E11.061 |
| 6,061,711 | A | 5/2000 | Song et al. |
| 6,393,582 | B1 | 5/2002 | Klecka et al. |
| 8,856,587 | B2 | 10/2014 | Moyer |
| 9,342,394 | B2 | 5/2016 | Nachimuthu et al. |

(Continued)

FOREIGN PATENT DOCUMENTS

| CN | 1434941 A | 8/2003 |
| CN | 101539875 A | 9/2009 |

(Continued)

*Primary Examiner* — Marc Duncan
(74) *Attorney, Agent, or Firm* — Womble Bond Dickinson (US) LLP

(57) ABSTRACT

An error recovery method and apparatus, and a system are disclosed. At least two CPUs in a lockstep mode can exit the lockstep mode when an error occurs in at least one CPU, and the CPU in which the error occurs and a type of the error are determined. When the error can be recovered, the CPU in which the error occurs can be recovered according to a correctly running CPU. This helps the at least two CPUs run again at a position at which a service program is interrupted.

12 Claims, 8 Drawing Sheets

At least two CPUs in a lockstep mode receive an interrupt, where the interrupt is used to indicate that an error occurs in at least one of the at least two CPUs — 810

The at least two CPUs exit the lockstep mode in response to the interrupt — 820

Determine a first CPU, in the at least two CPUs, in which an error occurs, and a type of the error — 830

Perform, when the error is a recoverable error, error recovery on the first CPU according to a state of a second CPU at a time of triggering the interrupt — 840

(56) References Cited

U.S. PATENT DOCUMENTS

| | | | |
|---|---|---|---|
| 10,761,925 B2* | 9/2020 | Thanner | G06F 11/1625 |
| 11,068,360 B2* | 7/2021 | Geng | G06F 11/1687 |
| 2002/0144177 A1 | 10/2002 | Kondo et al. | |
| 2006/0190702 A1 | 8/2006 | Harter et al. | |
| 2014/0258684 A1 | 9/2014 | Hastie et al. | |
| 2018/0129573 A1 | 5/2018 | Iturbe et al. | |
| 2019/0171536 A1* | 6/2019 | Refaeli | G06F 11/165 |

FOREIGN PATENT DOCUMENTS

| | | |
|---|---|---|
| CN | 103544087 A | 1/2014 |
| CN | 104035843 A | 9/2014 |
| CN | 109710445 A | 5/2019 |
| GB | 2555627 A | 5/2018 |

\* cited by examiner

ERROR RECOVERY METHOD AND APPARATUS

CROSS-REFERENCE TO RELATED APPLICATIONS

This application is a continuation of U.S. patent application Ser. No. 17/038,428, filed on Sep. 30, 2020, now U.S. Pat. No. 11,068,360, which a continuation of International Application No. PCT/CN2020/093188, filed on May 29, 2020, which claims the priority to Chinese Patent Application No. 201910473113.6, filed on May 31, 2019. All of the afore-mentioned patent applications are hereby incorporated by reference in their entireties.

TECHNICAL FIELD

This application relates to the computer field, and more specifically, to an error recovery method and apparatus in the computer field.

BACKGROUND

Trends such as autonomous driving make functional security a key indicator of an automotive industry. More and more software and hardware systems need to be secure. These security systems need to operate reliably to ensure personal safety, even in a case of failure or accident. In this case, security redundancy needs to be considered at a plurality of layers, such as an overall development process, hardware, software, and an algorithm. When a partition becomes invalid, an error can be found timely and recovered without affecting a function of another partition.

To meet the foregoing security requirement, a lockstep system emerges. The lockstep system is a fault-tolerant computer system that uses a lockstep mechanism, and implements the security redundancy by running a same group of operations at the same time in parallel. In the lockstep system, two independent central processing units (CPUs) execute a same instruction in a same clock cycle. An error check function is added to each CPU, for example, error correction code (ECC) parity check. In addition, outputs of the two CPUs are compared through a comparator. When a comparison result is that two bits or more than two bits are inconsistent, and an error is found in one CPU after checking but the other CPU is normal after checking, lockstep is disabled. Therefore, the CPU in which an error is found after checking is stopped and the CPU that is normal after checking works normally. If the comparison result is that only one bit is in consistent and an error is found in only one CPU after checking, a previous state is returned. When an error is found in each of the two CPUs after checking or each of the two CPUs is normal after checking, but output results of the two CPUs are inconsistent, the two CPUs fall out of synchronization and the system stops running. It can be seen that, in the existing lockstep system, when the comparison result is that only one bit is inconsistent and an error is found in only one CPU after checking, the two CPUs are recovered to previous saving states of current running states of the CPUs for rerunning. If a multi-bit error occurs, and the error cannot be corrected, the lockstep system exits a lockstep mode, and a service stops. Therefore, an error recovery capability of the existing lockstep system is relatively weak, and system reliability cannot meet a requirement of a security service.

SUMMARY

This application provides an error recovery method and apparatus, to improve an error recovery capability of a lockstep system and improve system reliability.

According to a first aspect, an error recovery method is provided. The method includes: when a first CPU in at least two central processing units CPUs in a lockstep mode has an error, receiving an interrupt; exiting, by the at least two CPUs, the lockstep mode in response to the interrupt; determining a type of the error of the first CPU in which the error occurs; and when the error is a recoverable error, performing error recovery on the first CPU according to a state of a correctly running second CPU in the at least two CPUs at a time of triggering the interrupt. Therefore, in the solution in this embodiment of this application, based on determining on an error type of a lockstep CPU, and when the error type is recoverable, the CPU in which the error occurs can be recovered according to a state of a CPU that runs normally, so that the at least two CPUs run again at a position at which a service program is interrupted. Therefore, in this embodiment of this application, an error recovery capability of a lockstep system can be improved, and system reliability can be improved.

In an embodiment, the state of the second CPU at the time of triggering the interrupt includes a software-visible CPU context of the second CPU at the time of triggering the interrupt, and the CPU context includes a value of a system register and a value of a general purpose register; and the performing error recovery on the first CPU according to a state of a correctly running second CPU in the at least two CPUs at a time of triggering the interrupt includes: obtaining, from a memory, a software-visible CPU context of the second CPU at the time of triggering the interrupt; and updating, according to the software-visible CPU context of the second CPU, a software-visible CPU context of the first CPU.

In an embodiment, the software-visible CPU context of the second CPU and data in a cache at the time of triggering the interrupt is saved to the memory. A software-visible CPU context of the first CPU and data in a cache at the time of triggering the interrupt is saved to the memory.

In an embodiment, when the at least two CPUs in the lockstep CPU exit the lockstep mode and enter a split mode, a quantity of software-visible CPUs changes from one to a plurality. In this case, on one hand, initialization of a memory stack of the CPU context is performed, to ensure that contexts of a plurality of CPUs are stored in different stacks. This can prevent data from being overwritten. In addition, data in a CPU L1/L2 cache is flushed to an external memory, to ensure that data cannot be lost when the CPU re-enters the lockstep mode. On the other hand, the at least two CPUs separately jump to an entry of an exception vector table, and synchronize an error of the CPU, to ensure that an asynchronous error in a system can be immediately reported at this moment, and prepare for subsequent query of an error type.

In an embodiment, the performing error recovery on the first CPU according to a state of a correctly running second CPU in the at least two CPUs at a time of triggering the interrupt includes: obtaining, by using the first CPU through a hardware channel between the first CPU and the second CPU, a software-visible CPU context of the second CPU at the time of triggering the interrupt, and updating, according to the software-visible CPU context of the second CPU, a software-visible CPU context of the first CPU, where the CPU context includes a value of a system register and a value of a general purpose register.

It should be noted that in some special cases, that an error occurs in a register at which level is unknown, for example, a system suspension. In this case, registers of all levels can be repaired in a hardware channel-based manner.

In an embodiment, the method further includes: after the software-visible CPU context of the first CPU is updated, respectively resetting software-invisible microarchitecture states of the first CPU and the second CPU, and retaining the respective software-visible CPU context, so that the first CPU and the second CPU re-enter the lockstep mode. In other words, an error CPU resets all software-invisible hardware states, clears data in a CPU cache, and reserves software-visible states in the system register and the general register. Therefore, before the resetting, software-visible states set by the at least two CPUs are completely the same. After the resetting, software-visible states of the at least two CPUs are still the same, and the at least two CPUs obtain data and an instruction from the external memory and receive a same input instruction stream.

In an embodiment, the performing error recovery on the first CPU according to a state of a correctly running second CPU in the at least two CPUs at a time of triggering the interrupt includes: respectively resetting the first CPU and the second CPU, and executing an initialization instruction to recover a software-visible CPU context, so that the first CPU and the second CPU re-enter the lockstep mode, where the initialization instruction includes a software-visible CPU context of the second CPU at the time of triggering the interrupt, and is used to recover a software-visible CPU context of the first CPU to the software-visible CPU context of the second CPU at the time of triggering the interrupt, and the CPU context includes a value of a system register and a value of a general purpose register.

In some embodiments, the first CPU and the second CPU may be reset at the same time, and execute the initialization instruction at the same time, so that the first CPU and the second CPU re-enter the lockstep mode. Therefore, before the resetting, software-visible states set by the at least two CPUs are completely the same. After the resetting, software-visible states of the at least two CPUs are still the same, and the at least two CPUs obtain data and an instruction from the external memory and receive a same input instruction stream.

In an embodiment, the determining a first CPU, in the at least two CPUs, in which an error occurs, and a type of the error includes: determining the type of the error according to an advanced configuration and power management interface (ACPI) table corresponding to the first CPU, where the ACPI table is used to record an error found when a status register of a reliability, availability, and serviceability (RAS) node of a CPU is polled. In this way, when an RAS error occurs in the CPU, the CPU is interrupted, or the system is abnormal and enters an UEFI or a BIOS. The UEFI or the BIOS traverses status registers of all RAS nodes, and records an error corresponding to the CPU in a memory table (namely, the APCI table). Therefore, an ACPI driver of an operating system can parse the table to know which node in the system has an error of which type. Alternatively, the first CPU polls a status register of an RAS node of the first CPU, to determine the type of the error. In this way, when an RAS error occurs in the CPU, the CPU is interrupted, or the system is abnormal. In this case, an RAS driver directly traverses status registers of all RAS nodes in sequence, to determine a cause of the error, instead of obtaining the cause by querying the ACPI table.

In a possible embodiment, the second CPU may further poll a status register of an RAS node of the second CPU, to determine that the second CPU runs normally.

In a possible embodiment, the second CPU may further determine, according to an ACPI table corresponding to the second CPU, that the second CPU runs normally.

In a possible embodiment, when the at least two CPUs enter the split mode, each CPU may determine whether an error occurs in the CPU, and does not need to query the RAS node or the ACPI table. In other words, in this case, which CPU is a CPU in which an error occurs and which CPU is a CPU that runs normally may be directly determined.

In an embodiment, the receiving, by at least two CPUs in a lockstep mode, an interrupt includes: receiving, by the at least two CPUs, the interrupt sent by an interrupt controller, and the interrupt controller sends the interrupt to the at least two CPUs when a comparator circuit determines that outputs of the at least two CPUs are inconsistent.

In a possible embodiment, the comparison circuit may be implemented by a dedicated hardware circuit, and is not disposed on a critical path. For example, the comparison circuit may be disposed outside the CPU. In this way, the comparison circuit has no impact on performance of the CPU.

In a possible implementation, the comparison circuit is a comparison circuit at a CPU clock cycle level. Specifically, a comparison circuit corresponding to the lockstep CPU shares a clock source with the lockstep CPU, to ensure that the comparison circuit and the CPU are at a same frequency, and implement cycle-by-cycle data comparison. Therefore, an error can be found in time, and error recovery or other further processing can be performed as soon as possible.

In an embodiment, the outputs of the at least two CPUs include at least one of an internal bus output of each of the at least two CPUs, an external bus output of each of the at least two CPUs, and an L3 cache control logic output of each of the at least two CPUs.

In an embodiment, the determining a first CPU, in the at least two CPUs, in which an error occurs, and a type of the error includes:

querying a status register of an RAS node corresponding to the comparator circuit to determine the first CPU, in the at least two CPUs, in which the error occurs and the type of the error.

In this case, when the comparator determines that the obtained outputs of the CPUs are inconsistent, an RAS interrupt may be reported, and information about inconsistent data of the comparison is provided in a register of an RAS node corresponding to the comparator, for example, at least one of an error data address, an error module, and an error type.

In an embodiment, the method further includes: stopping running the at least two CPUs when the error is an unrecoverable error.

According to a second aspect, an error recovery apparatus is provided. The apparatus includes a first central processing unit CPU and a second CPU.

The first CPU is configured to: receive an interrupt, where the interrupt is triggered by an error that occurs in a first CPU when the first CPU and a second CPU are in a lockstep mode, exit the lockstep mode in response to the interrupt, determine a type of the error, and when the error is a recoverable error, perform error recovery according to a state of the second CPU at a time of triggering the interrupt; and the second CPU is configured to receive the interrupt and exit the lockstep mode.

In an embodiment, the first CPU is configured to: obtain, from a memory, a software-visible CPU context of the second CPU at the time of triggering the interrupt, and update, according to the software-visible CPU context of the second CPU, a software-visible CPU context of the first CPU, where the CPU context includes a value of a system register and a value of a general purpose register.

In an embodiment, the second CPU is further configured to save the software-visible CPU context of the second CPU and data in a cache at the time of triggering the interrupt to the memory.

In an embodiment, the first CPU is configured to: obtain, through a hardware channel between the first CPU and the second CPU, a software-visible CPU context of the second CPU at the time of triggering the interrupt, and update, according to the software-visible CPU context of the second CPU, a software-visible CPU context of the first CPU, where the CPU context includes a value of a system register and a value of a general purpose register.

In an embodiment, the first CPU is further configured to: after the software-visible CPU context is updated, reset a software-invisible microarchitecture state of the first CPU, and retain the software-visible CPU context of the first CPU, so that the first CPU re-enters the lockstep mode; and the second CPU is further configured to: after the software-visible CPU context of the first CPU is updated, reset a software-invisible microarchitecture state of the second CPU, and retain the software-visible CPU context of the second CPU, so that the second CPU re-enters the lockstep mode.

In an embodiment, the first CPU is configured to be reset, and after the resetting, is specifically configured to execute an initialization instruction to recover a software-visible CPU context, so that the first CPU re-enters the lockstep mode, where the initialization instruction includes a software-visible CPU context of the second CPU at the time of triggering the interrupt, and is used to recover a software-visible CPU context of the first CPU to the software-visible CPU context of the second CPU at the time of triggering the interrupt, and the CPU context includes a value of a system register and a value of a general purpose register.

The second CPU is configured to be reset, and after the resetting, is configured to execute the initialization instruction, so that the second CPU re-enters the lockstep mode.

In some embodiments, the first CPU and the second CPU may be reset at the same time, and execute the initialization instruction at the same time, so that the first CPU and the second CPU re-enter the lockstep mode.

In an embodiment, the first CPU is specifically configured to: determine the type of the error according to an ACPI table corresponding to the first CPU, where the ACPI table is used to record an error found when a status register of a reliability, availability, and serviceability RAS node of a CPU is polled; or poll a status register of an RAS node of the first CPU, to determine the type of the error.

In an embodiment, the first CPU is configured to receive the interrupt sent by an interrupt controller, where the interrupt controller sends the interrupt to the first CPU and the second CPU when a comparator circuit determines that outputs of the first CPU and the second CPU are inconsistent; and the second CPU is configured to receive the interrupt sent by the interrupt controller.

In an embodiment, the outputs of the CPUs include at least one of an internal bus output of the CPU, an external bus output of the CPU, and an L3 cache control logic output of the CPU.

In an embodiment, the first CPU is further configured to query a status register of an RAS node corresponding to the comparator circuit to determine the first CPU in which the error occurs and the type of the error.

In an embodiment, the first CPU and the second CPU further stop running when the error is an unrecoverable error.

In an embodiment, the apparatus further includes an interrupt controller and a comparator circuit. The comparator circuit is configured to obtain outputs of the first CPU and the second CPU, and send a first signal to the interrupt controller when determining that the outputs of the first CPU and the second CPU are inconsistent, where the first signal is used to indicate the interrupt controller to send an interrupt to the first CPU and the second CPU; and the interrupt controller sends the interrupt to the first CPU and the second CPU according to the first signal.

According to a third aspect, an error recovery apparatus is provided. The apparatus includes a determining unit and a recovery unit. When an error occurs in a first CPU in at least two central processing units CPUs that are in a lockstep mode, and when the at least two CPUs exit the lockstep mode, the determining unit is configured to determine a type of the error in the first CPU; and the recovery unit is configured to perform, when the error is a recoverable error, error recovery on the first CPU according to a state of a correctly running second CPU in the at least two CPUs at a time of trigering an interrupt.

In an embodiment, the recovery unit is configured to: obtain, from a memory, a software-visible CPU context of the second CPU at the time of triggering the interrupt, and update, according to the software-visible CPU context of the second CPU, a software-visible CPU context of the first CPU, where the CPU context includes a value of a system register and a value of a general purpose register.

In an embodiment, the apparatus further includes a CPU context management unit. The CPU context management unit is configured to save the software-visible CPU context of the second CPU and data in a cache at the time of triggering the interrupt to the memory.

In an embodiment, the apparatus further includes an initialization unit. The initialization unit is configured to: after the first CPU and the second CPU are reset, execute an initialization instruction to recover a software-visible CPU context, so that the first CPU and the second CPU re-enter the lockstep mode, where the initialization instruction includes a software-visible CPU context of the second CPU at the time of triggering the interrupt, and is used to recover a software-visible CPU context of the first CPU to the software-visible CPU context of the second CPU at the time of triggering the interrupt, and the CPU context includes a value of a system register and a value of a general purpose register.

In an embodiment, the determining unit is configured to: determine the type of the error according to an advanced configuration and power management interface ACPI table corresponding to the first CPU, where the ACPI table is used to record an error found when a status register of a reliability, availability, and serviceability RAS node of a CPU is polled; or poll a status register of an RAS node of the first CPU, to determine the type of the error.

In an embodiment, the determining unit is configured to: query a status register of an RAS node corresponding to the comparator circuit, to determine the first CPU, in the at least two CPUs, in which the error occurs and the type of the error, where the comparator circuit is configured to send a first signal to an interrupt controller when determining that outputs of the at least two CPUs are inconsistent, and the first signal is used to indicate the interrupt controller to send an interrupt to the at least two CPUs to trigger the at least two CPUs to exit the lockstep mode.

In an embodiment, the outputs of the at least two CPUs include at least one of an internal bus output of each of the at least two CPUs, an external bus output of each of the at least two CPUs, and an L3 cache control logic output of each of the at least two CPUs.

In an embodiment, the determining unit is further configured to control the at least two CPUs to stop running when the error is an unrecoverable error.

According to a fourth aspect, a comparison circuit for querying an error is provided. The comparison circuit is disposed outside at least two CPUs in a lockstep mode, and the comparison circuit is configured to: determine that outputs of the at least two CPUs are inconsistent, and send a first signal to an interrupt controller according to the inconsistent outputs of the at least two CPUs, where the first signal is used to indicate the interrupt controller to send an interrupt to the at least two CPUs, and the interrupt is used to indicate that an error occurs in at least one of the at least two CPUs.

In an embodiment, the outputs of the at least two CPUs include at least one of an internal bus output of each of the at least two CPUs, an external bus output of each of the at least two CPUs, and an L3 cache control logic output of each of the at least two CPUs.

According to a fifth aspect, an error recovery apparatus is provided. The apparatus includes a module corresponding to the method/operation/step/action according to the first aspect.

According to a sixth aspect, an error recovery apparatus is provided. The apparatus includes a processor, and the processor is configured to invoke the program code stored to the memory, to perform some or all operations in any manner according to the first aspect.

In the sixth aspect, the memory storing the program code may be located inside the error recovery apparatus (the error recovery apparatus may further include a memory in addition to the processor), or may be located outside the error recovery apparatus (the memory may be a memory of another device). As an example, the processor may be a lockstep CPU, and the lockstep CPU includes at least two physical CPUs.

In an embodiment, the memory is a non-volatile memory.

When the error recovery apparatus includes a processor and a memory, the processor and the memory may be coupled together.

As an example, the error recovery apparatus may be a terminal, or may be an apparatus (for example, a chip, or an apparatus that can match and be used by a terminal) that is in the terminal and that is configured to perform error recovery. The terminal may be specifically a smartphone, an in-vehicle apparatus, a wearable device, or the like. Optionally, the foregoing in-vehicle apparatus may be a computer system that is independent of an automobile but that can be applied to the automobile, or may be a computer system integrated into an automobile (for example, a self-driving automobile).

According to a seventh aspect, a computer-readable storage medium is provided. The computer-readable storage medium stores program code, and the program code includes an instruction used to perform some or all operations in the method according to the first aspect.

Optionally, the computer-readable storage medium is located in a terminal, and the terminal may be an apparatus that can perform error recovery.

According to an eighth aspect, an embodiment of this application provides a computer program product. When the computer program product runs on an error recovery apparatus, the error recovery apparatus performs some or all of the operations in the method according to the first aspect.

According to a ninth aspect, a chip is provided. The chip includes a processor, and the processor is configured to perform some or all operations in the method according to the first aspect.

DESCRIPTION OF EMBODIMENTS

First, related terms in the embodiments of this application are described.

Lockstep CPU: A lockstep CPU is a logical CPU, and includes at least two physical CPUs (which may also be referred to as CPUs), or includes at least two physical cores. As an example, the at least two CPUs may be disposed on one chip, or distributed on different chips. This is not limited in this embodiment of this application. In some descriptions, the lockstep CPU may also be referred to as a lockstep logical CPU. For ease of description, an example in which one logical CPU includes at least two CPUs is used below for description.

When the at least two CPUs in the lockstep CPU are in a lockstep mode, the at least two CPUs execute same code or a same instruction, and output a calculation result of one CPU. In this case, only one CPU is visible to software, but the lockstep CPU includes at least two (for example, a plurality of) CPUs.

Split CPU: When at least two CPUs in a lockstep CPU exit from a lockstep mode to a split mode in which the CPUs separately run normally. In this case, the at least two CPUs are visible to software.

It may be understood that the at least two CPUs in the lockstep mode should have a same output result. Once output results of the at least two CPUs are inconsistent, at least one CPU runs abnormally (in other words, an error occurs). When one CPU is faulty, the lockstep CPU is abnormal. The CPUs in the lockstep CPU need to exit the lockstep mode and enter the split mode.

CPU exception jump: When a CPU is running, if an error occurs or an interrupt needs to be responded, the CPU jump into an entry of an exception vector table or an interrupt vector table, and then a function is used to process the error or the interrupt. After the processing, the CPU may return to an originally interrupted position to continue running. As an example, when a lockstep CPU is abnormal, CPUs in the lockstep CPU jump abnormally, enter a split mode, and perform error recovery.

The following describes technical solutions of this application with reference to accompanying drawings.

Figure 1:
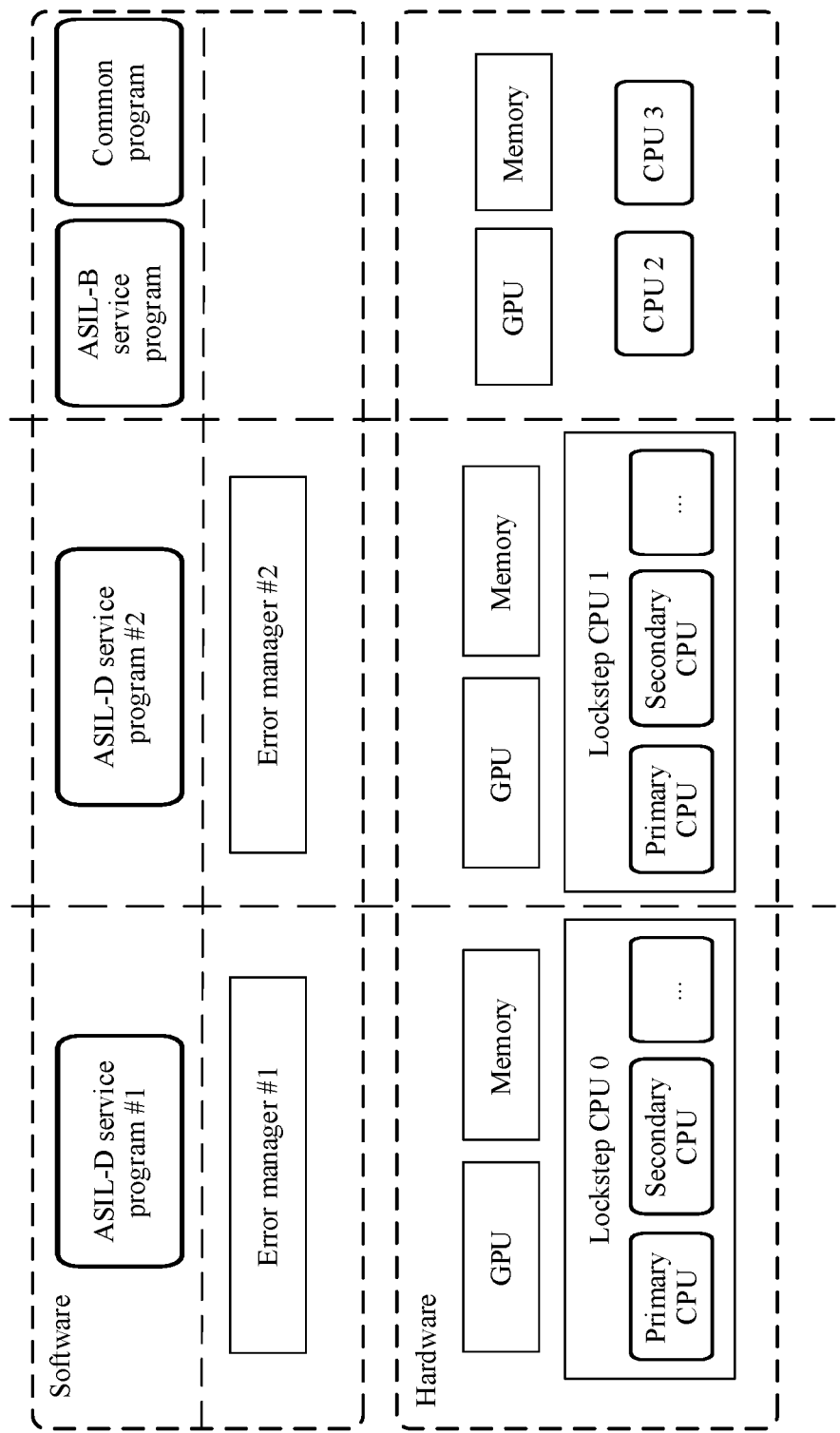
FIG. 1 shows an implementation form of a system according to an embodiment of this application.

FIG. 1 shows an implementation form of a system in platform software and hardware according to an embodiment of this application. As shown in FIG. 1, the hardware part may include a central processing unit (CPU), a graphics processing unit (GPU), a memory, and the like. The CPU includes a lockstep CPU 0, a lockstep CPU 1, a normal CPU 2, a normal CPU 3, and the like. This is not specifically limited in this embodiment of this application. The lockstep CPU may also be referred to as a lockstep logical CPU, and includes at least two CPUs (which may also be referred to as physical CPUs). As an example, one of the at least two CPUs may be referred to as a primary CPU, and the other of the at least two CPUs may be referred to as a secondary CPU or a redundant CPU. The software part includes different running service programs and a software module that manages a hardware module. As an example, the service program is, for example, an automotive safety integration level (ASIL)-D service program #1, an ASIL-D service program #2, an ASIL-B service program, or a common program. As an example, the software module that manages the hardware module may be, for example, an error manager #1 that manages the lockstep CPU 0, and an error manager #2 that manages the lockstep CPU 1.

It may be understood that, because the lockstep CPU can meet a security requirement, a service program having a relatively high security level requirement may run on the lockstep CPU, and a service program having a relatively low security level requirement may run on a normal CPU. For example, the ASIL-D service program #1 runs on the lockstep CPU 0, the ASIL-D service program #2 runs on the lockstep CPU 2, and the ASIL-B service program and the common program may run on the CPU 2 or the CPU 3. Applications of different security levels are isolated by using a container or a virtual machine, to prevent in-validness in one partition from affecting running of a program in another partition.

Figure 2:
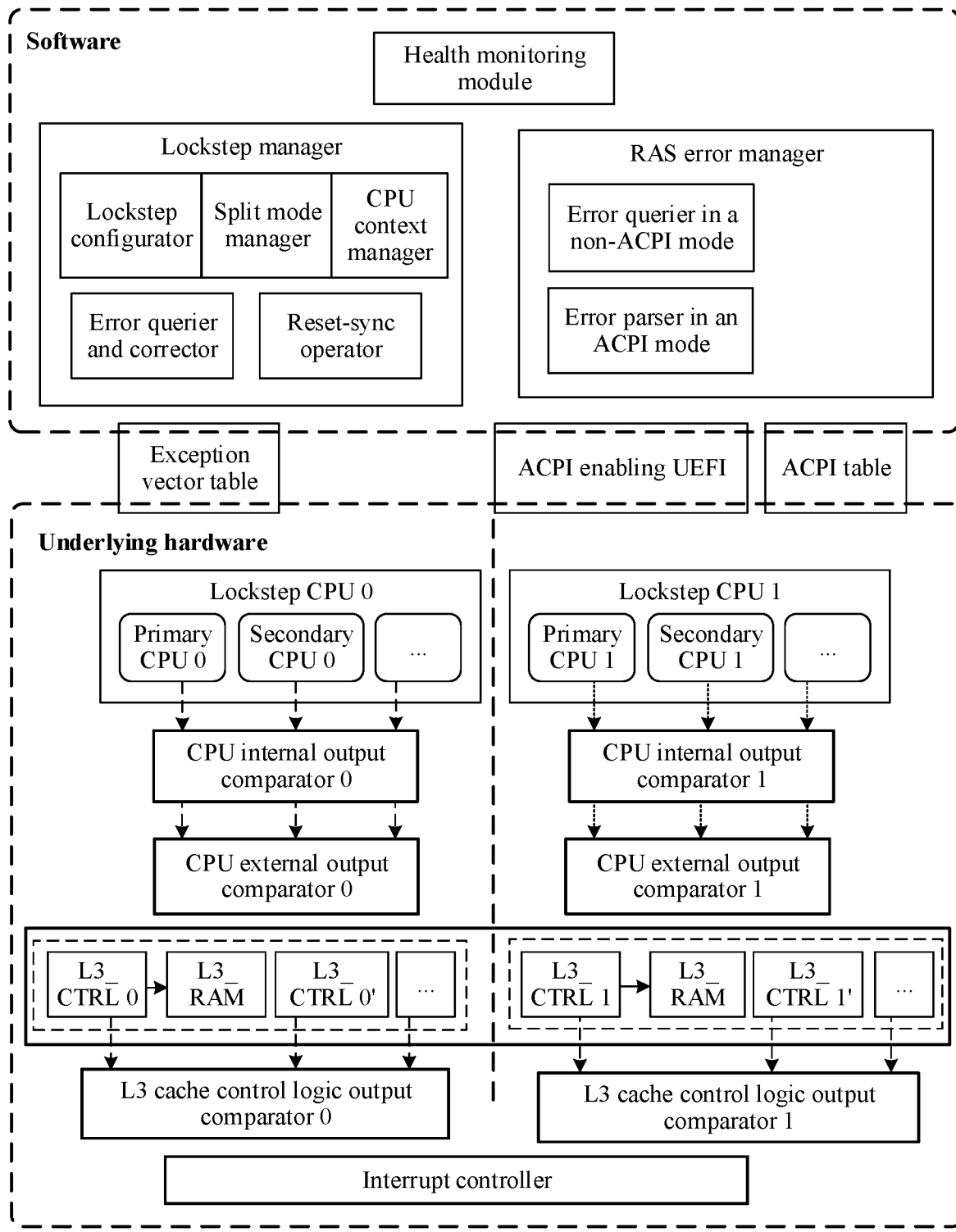
FIG. 2 is a schematic diagram of a system architecture according to an embodiment of this application.

FIG. 2 is a schematic diagram of a system architecture according to an embodiment of this application. The system architecture in this embodiment of this application includes a hardware architecture and a software architecture. The hardware architecture is used to provide a hardware platform for error detection and correction, and the software architecture is used to provide an error correction solution based on the hardware platform.

The hardware architecture may also be referred to as a hardware layer or an underlying hardware layer. The hardware layer may include at least one lockstep CPU and an interrupt controller. The interrupt controller is configured to perform interrupt control when an error occurs in a CPU in the lockstep CPU.

As shown in FIG. 2, the hardware layer includes a lockstep CPU 0 and a lockstep CPU 1. The lockstep CPU 0 further includes a primary CPU 0 and at least one secondary CPU 0. The lockstep CPU 1 further includes a primary CPU 1 and at least one secondary CPU 1. FIG. 2 shows only one secondary CPU as an example, and does not constitute a limitation on this embodiment of this application.

In an embodiment, at least one comparator (or referred to as a comparison circuit) is disposed in each lockstep CPU, and is configured to obtain and compare outputs of at least two CPUs included in the lockstep CPU. In an example, an output of each CPU included in the lockstep CPU may be obtained and compared by using a comparator disposed outside the lockstep CPU.

Specifically, the comparison circuit may be implemented by a dedicated hardware circuit, and is not disposed on a critical path. For example, the comparison circuit may be disposed outside the CPU. In this way, the comparison circuit has no impact on performance of the CPU.

In an embodiment, the comparison circuit is a comparison circuit at a CPU clock cycle level. Specifically, a comparison circuit corresponding to the lockstep CPU shares a clock source with the lockstep CPU, to ensure that the comparison circuit and the CPU are at a same frequency, and implement cycle-by-cycle data comparison. Therefore, an error can be found in time, and error recovery or other further processing can be performed as soon as possible. In an example, the at least one comparator and the lockstep CPU may be disposed on a chip, to share the clock source with the lockstep CPU. However, this is not limited in this embodiment of this application.

In an embodiment, the output of the CPU includes at least one of an internal bus output of each of the at least two CPUs, an external bus output of each CPU, and an L3 cache control logic output (L3_CTRL) of each CPU. As an example, the internal bus output of the CPU is, for example, an L1 cache of the CPU, and the external bus output of the CPU is, for example, an L2 cache (L2 cache) of the CPU.

In an embodiment of this application, an L3_CTRL, namely, a redundant L3_CTRL corresponding to the secondary CPU may be added. In an example, as shown in FIG. 2, L3 cache control logic of the lockstep CPU 0 includes, for example, L3_CTRL0, L3_RAM, and L3_CTRL0', and L3 cache control logic of the lockstep CPU 1 includes, for example, L3_CTRL1, L3_RAM, and L3_CTRL1'. This is not limited in this embodiment of this application.

As an example, as shown in FIG. 2, the lockstep CPU 0 is used as an example. A CPU internal output comparator 0 may be configured to compare an internal bus output of the primary CPU 0 with an internal bus output of the at least one secondary CPU 0. A CPU external output comparator 0 may be configured to compare an external bus output of the primary CPU 0 with an external bus output of the at least one secondary CPU 0. An L3 cache control logic output comparator 0 may be configured to compare an L3 cache control logic output (L3_CTRL0) of the primary CPU 0 with an L3 cache control logic output (L3_CTRL0') of the at least one secondary CPU 0.

It should be noted that the CPU internal output comparator may be disposed outside the CPU, and obtains an internal bus output of the CPU by using a data line. This is not limited in this embodiment of this application.

It should be noted that the hardware layer in FIG. 2 is merely used as an example, and constitutes no limitation on this application.

For example, in an embodiment of this application, one lockstep CPU may be provided with one or two of a CPU internal output comparator, a CPU external output comparator, and an L3 cache control logic output comparator. For another example, different lockstep CPUs may use different comparator setting manners. For example, the lockstep CPU 0 is provided with only the CPU internal output comparator 0, and the lockstep CPU 1 is provided with only a CPU external output comparator 1.

In a specific example, the CPU external output comparator may be set as a first-level comparison circuit, and the L3 cache control logic output comparator may be set as a second-level comparison circuit, but the CPU internal output comparator is not set. In other words, data output by an internal bus of the CPU is not compared. In this way, one level of comparison circuit can be reduced. In this case, when an error inside the CPU is transmitted to outside of the CPU, the error can be founded by a comparison circuit outside the CPU.

For another example, in an embodiment of this application, one lockstep CPU may include two physical CPUs, or include three physical CPUs.

In a possible embodiment, when finding that outputs of the at least two CPUs in the lockstep mode are inconsistent, a comparator (for example, any one of the foregoing comparators) may send a signal to an interrupt controller, where the signal is used to indicate the interrupt controller to send an interrupt to the at least two CPUs. After receiving the signal, the interrupt controller sends the interrupt to the lockstep CPU. The interrupt indicates that the at least two CPUs are abnormal. When the at least two CPUs in the lockstep CPU receive the interrupt, the at least two CPUs exit the lockstep mode, that is, enter a split mode. In the split mode, the comparator does not work.

In a possible embodiment, in the split mode, an L3_CTRL corresponding to a primary CPU in the lockstep CPU works, and a redundant L3_CTRL corresponding to a secondary CPU in the lockstep CPU is in a gated off state. In this case, requests of all CPUs (including the primary CPU and the secondary CPU) in the lockstep CPU are sent to the L3_CTRL in the working state, then are converted by the L3_CTRL, and are output to the L3_RAM. As an example, a request sent by the CPU is, for example, a read/write request, a query request, a replacement request. This is not limited in this embodiment of this application.

The software architecture may also be referred to as a software layer. As shown in FIG. 2, the software layer mainly includes a lockstep manager, a reliability, availability, and serviceability (RAS) error manager, and a health monitoring module. The lockstep manager is configured to manage at least two CPUs in a lockstep CPU. The RAS error manager is used to determine a CPU in which an error occurs and a type of the error when the error occurs in a CPU in the lockstep CPU. The health monitoring module is responsible for performing decision processing on the type of the error.

As an example, the lockstep manager may include a lockstep configurator, a split mode manager, a CPU context manager, an error querier and corrector, and a reset-sync operator.

The lockstep configurator sets at least two physical CPUs in a computer system as one lockstep logical CPU, and sets a quantity of lockstep logical CPUs in the system.

The split mode manager manages a lockstep exception vector table and an interrupt processing function. When a comparator finds that data output by the at least two CPUs in the lockstep CPU is inconsistent, an interrupt controller sends an interrupt to the at least two CPUs, and the at least two CPUs enter a split mode from a lockstep mode. In this case, the at least two CPUs in the split mode separately jump to an entry of the exception vector table, to invoke the CPU context manager and the interrupt processing function.

In a possible embodiment, when the at least two CPUs enter the split mode, each CPU may determine whether an error occurs in the CPU. In other words, in this case, that which CPU is a CPU in which an error occurs and which CPU is a CPU that runs normally may be determined.

The CPU context manager stores, when the at least two CPUs exit the lockstep mode, a software-visible CPU context and data in an L1/L2 cache to an L3 cache or different stacks in a memory, to prepare for subsequent error correction. Herein, the software-visible CPU context includes CPU states in a kernel mode and a user mode, namely, data of a system register and data of a general purpose register that are corresponding to the CPU.

The error querier and corrector can be invoked by an interrupt processing function. In an example, when the CPU enters the split mode and the CPU in which the error occurs is determined, the error querier and corrector may query an RAS error manager corresponding to the CPU in which the error occurs, to determine a type of the error of the CPU in which the error occurs. In another example, when the CPU enters the split mode and the CPU in which the error occurs is not determined, the error querier and corrector may query an RAS error manager corresponding to each CPU, to determine the CPU in which the error occurs and a type of the error.

In an embodiment of this application, the error type includes a recoverable error and an unrecoverable error. When it is determined that the error type of the CPU is an unrecoverable error, the health monitoring module is notified of performing decision processing on the CPU in which the error occurs, for example, bringing the CPU in which the error occurs offline. When it is determined that the error type of the CPU is a recoverable error, the error querier and corrector corrects the CPU in which the error occurs.

The reset-sync operator enables the at least two physical CPUs in the split mode to re-enter the lockstep mode. The reset-sync operator may be implemented in a hardware manner, or may be implemented in a software manner. This is not limited in this embodiment of this application.

The RAS-error manager may include an error parser in an advanced configuration and power management interface (ACPI) mode, and an error querier in a non-ACPI mode.

As an example, the RAS error manager includes one or more RAS nodes, and each RAS node is corresponding to one or more status registers, and the status register configured to store various types of errors that occur in the CPU.

An error parser in the ACPI mode can perform error query in the ACPI mode. Specifically, the error parser may query an error state of the CPU by using an ACPI table. When an RAS error occurs in the CPU, the CPU is interrupted, or a system is abnormal and enters a unified extensible firmware interface (UEFI) or a basic input/output system (BIOS). The UEFI or the BIOS traverses status registers of all RAS nodes, and records an error corresponding to the CPU in a memory table (namely, the APCI table). An ACPI driver of an operating system can parse the table to know which node in the system has an error of which type.

Figure 3:
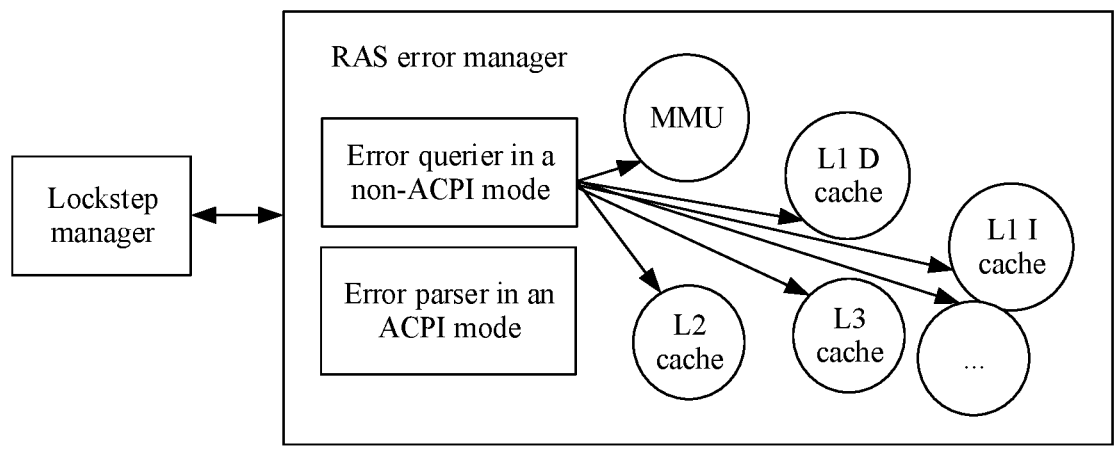
FIG. 3 shows an example of a query manner.

An error querier in the non-ACPI mode can perform error query in the non-ACPI mode. As an example, in FIG. 3, a memory management unit (MMU), an L1 data (L1 data, L1 D for short) cache, an L1 indicator (LII) cache, an L3 cache, and an L2 cache each have one RAS node. When an RAS error occurs in the CPU, the CPU is interrupted, or the system is abnormal. In this case, an RAS driver directly traverses status registers of all RAS nodes in sequence, to determine a cause of the error, instead of obtaining the cause by querying the ACPI table.

It should be noted that in this embodiment of this application, the ACPI mode may be preferentially used to query the error. If no error is found in this mode, the non-ACPI mode may be used to query the error. This is because, for a producer error in the RAS node, the RAS register records the error, but the system does not report the error. An exception is reported on a consumer side only when the CPU consumes error data. In this case, there is a possible that the error is not recorded in the ACPI table. In this case, the non-ACPI mode needs to be used to poll the status registers of the all RAS nodes to determine the error type.

It should be noted that the producer error refers that an entity generates an error, and the error is a producer error for the entity. This type of error is not triggered immediately after being generated, but is reported only during consumption. For example, the memory generates an error. When the memory generates the error, the memory does not proactively report the error. The error is triggered only when another component read the error.

In an embodiment, one or more RAS nodes may further be disposed for a comparator corresponding to the lockstep CPU. For example, one RAS node is disposed for each of the CPU internal output comparator 0, the CPU external output comparator 0, and the L3 cache control logic output comparator 0. This is not limited in this embodiment of this application. In this case, when the comparator determines that the obtained outputs of the CPUs are inconsistent, an RAS interrupt may be reported, and information about inconsistent data of the comparison is provided in a register of an RAS node corresponding to the comparator, for example, at least one of an error data address, an error module, and an error type. The error module includes, for example, an L1 cache controller, an L2 cache controller, and an L3 controller.

In addition, names of the foregoing functions or modules in this embodiment of this application are merely examples. In specific implementation, the names of the functions or modules in the system architecture shown in FIG. 2 may alternatively be other names. This is not specifically limited in this embodiment of this application.

Figure 4:
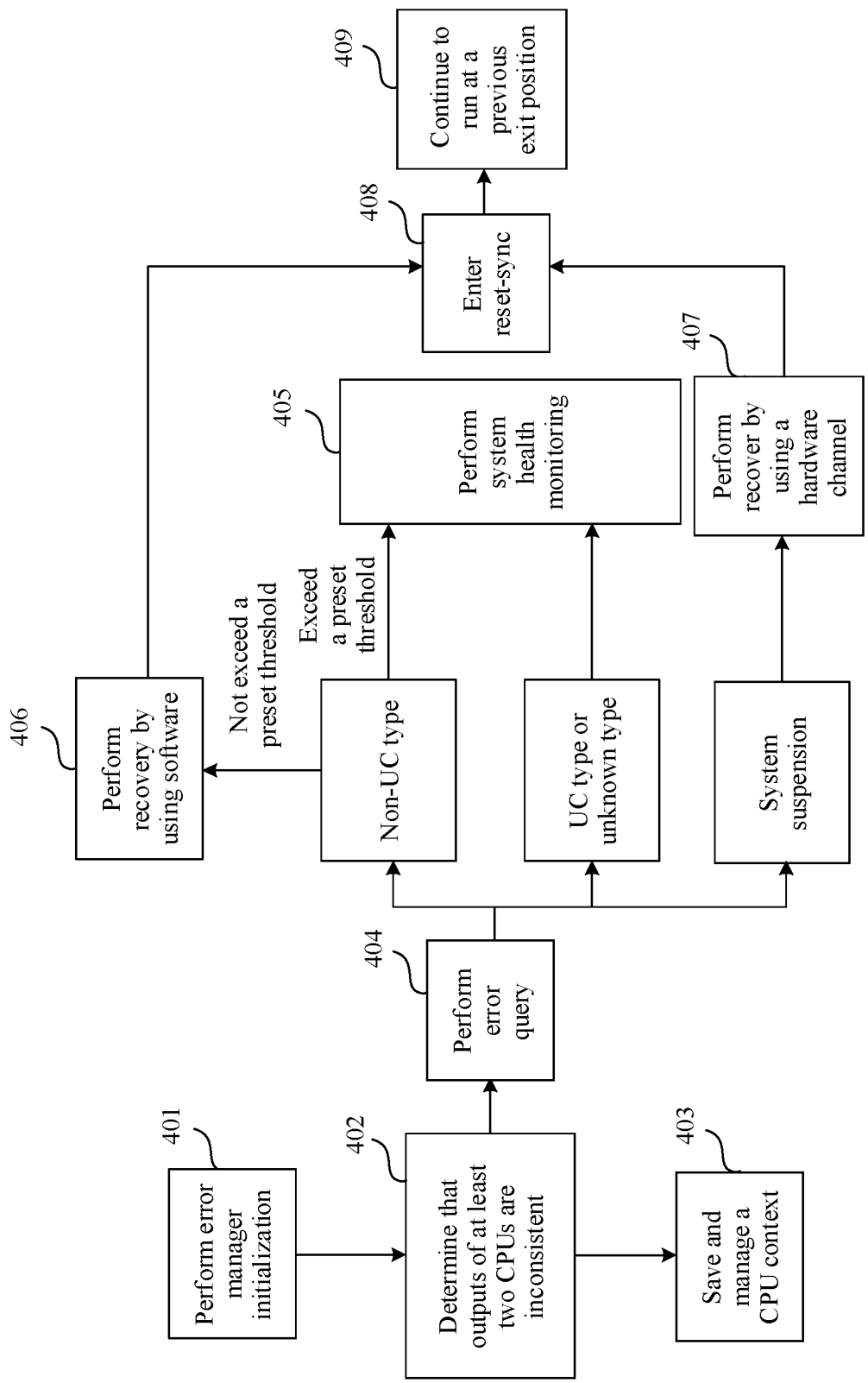
FIG. 4 is a schematic flowchart of an error recovery method according to an embodiment of this application.

FIG. 4 is a schematic flowchart of an error recovery method according to an embodiment of this application. The method shown in FIG. 4 may be performed by the system in FIG. 1, or may be performed by the system in FIG. 2. However, this embodiment of this application is not limited thereto. It should be understood that FIG. 4 shows steps or operations of a service processing method. However, these steps or operations are merely examples. Other operations or variants of the operations in FIG. 4 may alternatively be performed in this embodiment of this application. In addition, the operations in FIG. 4 may be performed in a sequence different from that shown in FIG. 4, and possibly, not all the operations in FIG. 4 need to be performed.

401: Perform lockstep manager initialization.

As an example, the lockstep manager initialization includes: resource configuration initialization, exception vector table initialization, interrupt processing function initialization, and the like. This is not limited in this embodiment of this application. Optionally, RAS error manager initialization may further be performed.

Figure 5:
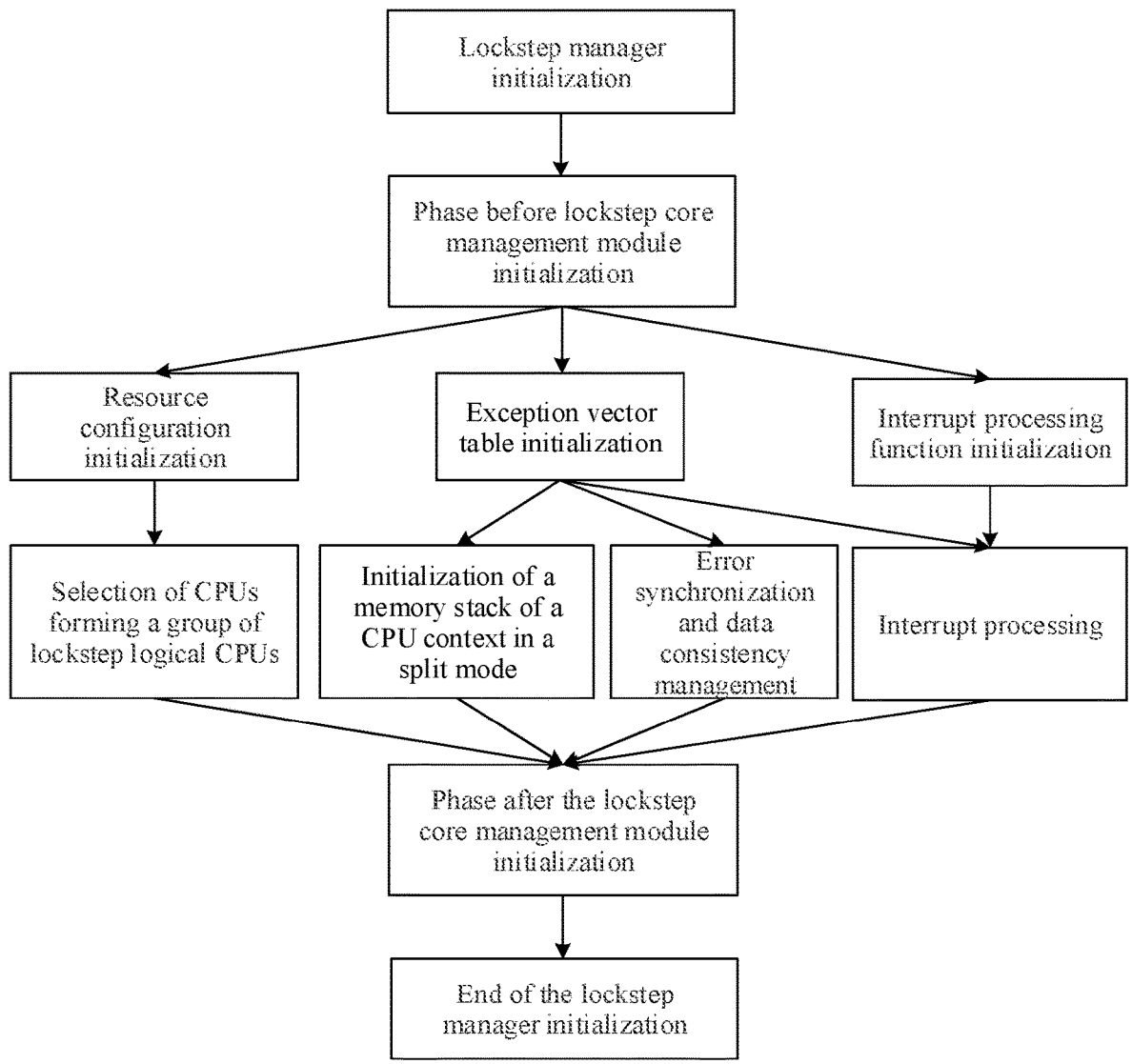
FIG. 5 shows a specific example of lockstep manager initialization.

FIG. 5 shows a specific example of the lockstep manager initialization. As shown in FIG. 5, in a phase before the lockstep manager initialization, a configuration file may be read.

Then, the resource configuration initialization, the exception vector table initialization, the interrupt processing function initialization are performed.

During the resource configuration initialization, two or more adjacent physical CPUs are selected to form a group of lockstep logical CPUs based on a service requirement. For example, when one lockstep CPU is required to run a task with a high safety level, during the resource configuration initialization, a physical CPU 0 and a physical CPU 1 may be configured as a group of lockstep logical CPUs to run a service program of the task.

The exception vector table initialization is initialization of a memory stack of a CPU context when a lockstep CPU enters a split mode, synchronize an error and manage data consistency, and process an interrupt. When the at least two CPUs in the lockstep CPU exit a lockstep mode and enter the split mode, a quantity of software-visible CPUs changes from one to a plurality. In this case, on one hand, initialization of a memory stack of the CPU context is performed, to ensure that contexts of a plurality of CPUs are stored in different stacks. This can prevent data from being overwritten. On the other hand, the at least two CPUs separately jump to an entry of an exception vector table, and synchronize an error of the CPU, to ensure that an asynchronous error in a system can be immediately reported at this moment, and prepare for subsequent query of an error type. In addition, data in a CPU L1/L2 cache is flushed to an external memory, to ensure that data cannot be lost when the CPU re-enters the lockstep mode.

The interrupt processing function initialization can process an interrupt, for example, an interrupt generated when an error occurs in a CPU in a lockstep CPU. As an example, a software layer invokes an interrupt processing function by using the entry of the exception vector table, and then the interrupt processing function invokes an error querier and corrector to query the error, and performs corresponding correction according to the error type.

After the resource configuration initialization, the exception vector table initialization, and the interrupt processing function initialization are completed, a phase after lockstep core management module initialization is entered.

Then, the lockstep manager initialization ends.

402: Determine that outputs of the at least two CPUs in the lockstep mode are inconsistent.

In an embodiment, an output of each of the at least two CPUs included in the lockstep CPU may be obtained by using a comparison circuit disposed outside the lockstep CPU, and then the comparison circuit determines whether the outputs of the at least two CPUs are consistent. Specifically, for the comparison circuit, refer to the description in FIG. 2. For brevity, details are not described herein again.

When determining that the outputs of the at least two CPUs in the lockstep mode are inconsistent, the comparison circuit sends a signal to an interrupt controller, and the interrupt controller sends an interrupt to the CPU according to the signal. In this case, the at least two CPUs enter the split mode from the lockstep mode. The at least two CPUs in the split mode separately jump to the entry of the interrupt vector table, to synchronize the error of the CPU. Then, 403 and 404 are performed.

403: Save and manage the CPU context.

As an example, the at least two physical CPUs in the split mode release CPU contexts corresponding to the at least two physical CPUs. Because at least one of the CPU contexts of the at least two CPUs is incorrect, the at least two CPU contexts and the data in the cache need to be refreshed to different stack addresses in the memory.

Figure 6:
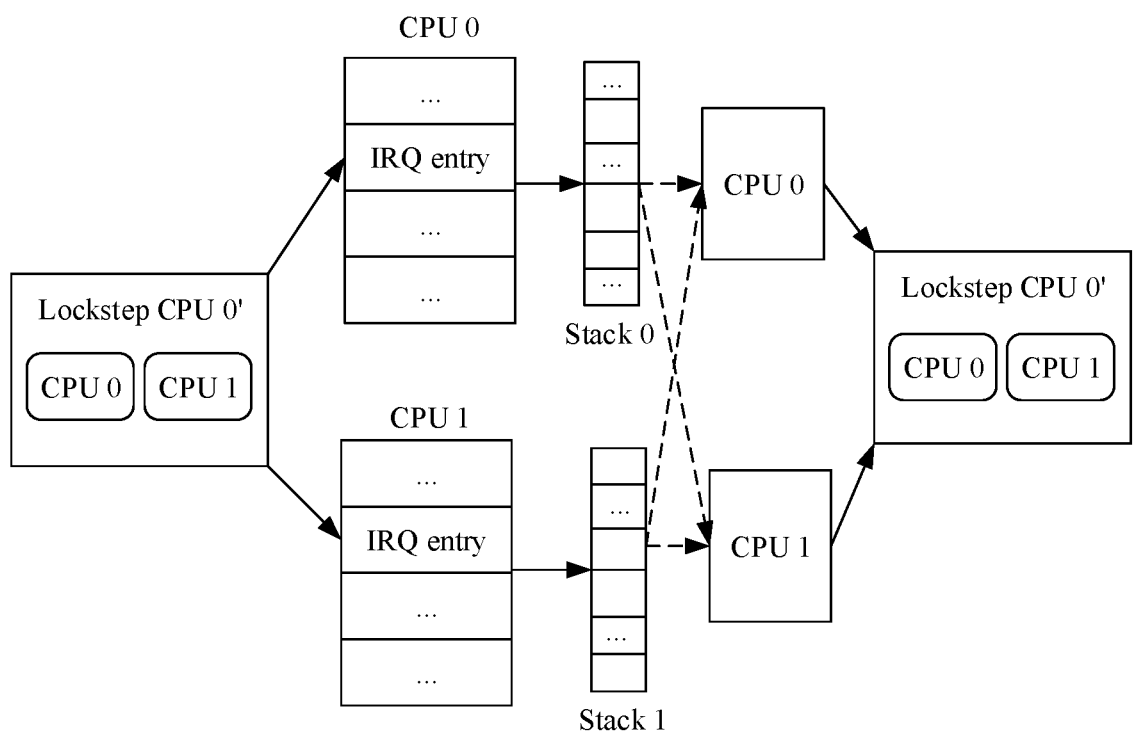
FIG. 6 shows an example of CPU context saving and recovery.

As an example, FIG. 6 shows an example of CPU context saving and recovery. As shown in FIG. 6, after a lockstep CPU 0' enters a split mode, a CPU 0 and a CPU 1 in the lockstep CPU 0' separately jump to an interrupt request (IRQ) entry. Then, a context of the CPU 0 is stored in a stack 0 in a memory, and a context of the CPU 1 is stored in a stack 1 in a memory. After the error query is performed, that which CPU in the CPU 0 and the CPU 1 is a correct CPU, and which CPU in the CPU 0 and the CPU 1 is an error CPU can be determined. Then, when the error is a recoverable error, the error is corrected according to a result of the error query. For example, a state of the error CPU may be set according to a context of the normal CPU stored to the memory. For example, when an error occurs in the CPU 0, and the CPU 1 runs correctly, the context stored in the stack 1 is restored to the CPU 0, to perform error correction on the CPU 0. Then, the two CPUs can re-enter the lockstep mode.

404: Perform the error query.

Specifically, 404 may be executed by the error querier and corrector. The error querier and corrector can send query information to an RAS error manager, and the RAS error manager can perform the error query. As an example, the RAS error manager performs the error query in an ACPI mode and a non-ACPI mode. Specifically, for the ACPI mode and the non-ACPI mode, refer to the foregoing description. For brevity, details are not described herein again.

In an embodiment, an RAS node corresponding to a comparator may be queried, to determine a CPU in which an error occurs and a type of the error, and another RAS node does not need to be polled. In this case, a lockstep error may be considered as a common RAS error. The error query may be performed by reading a register of an RAS node corresponding to the comparator provided by hardware. The ACPI mode or the non-ACPI mode may be used to poll an RAS error node of the comparator. Because the register includes at least one of an error data address, an error module, an error type, and the like. Therefore, the error type can be determined by reading the register of the RAS node corresponding to the comparator. As an example, the lockstep error may refer to an error that the outputs of the at least two CPUs are inconsistent when the lockstep CPU is in the lockstep mode.

As an example, the recoverable error includes an error of a non-uncontainable error (UC) type, an error of the non-UC type whose quantity of occurrences does not exceed a preset threshold, a system suspension, or the like. This is not limited in this embodiment of this application. As an example, the unrecoverable error may include at least one of an error of a UC type, an error of the non-UC type whose quantity of occurrences exceeds a preset threshold, and an error of an unknown type. This is not limited in this embodiment of this application.

In some possible embodiments, for the uncontainable error type or the unknown error type, a health monitoring module may be notified of performing system health monitoring. In other words, 405 is performed. When the quantity of occurrences of the error of the non-UC type exceeds the preset threshold, the health monitoring module may be notified of performing system health monitoring. In other words, 405 is performed. For the error of the non-UC type, if the quantity of occurrences of the error does not exceed the preset threshold, error recovery may be performed by using software, as shown in 406. When the CPU system is suspended, if the error is not propagated, error recovery can be performed by using a hardware channel, as shown in 407.

In some embodiments, when the lockstep CPU includes the two CPUs, and when the comparator determines that data output by the two physical CPUs is inconsistent, the RAS node corresponding to the comparator may be used to determine which CPU has an error and which type of error occurs.

In some embodiments, when the lockstep CPU includes three or more physical CPUs, and when the comparator determines that data output by the three or more physical CPUs is inconsistent, a CPU in which an error occurs may be determined according to a principle of determining one from more than one. Herein, the determining one from more than one means that when an output result of one of the at least three CPUs is inconsistent with output results of the other CPUs, it may be determined that an error occurs in this CPU. In this case, in a possible manner, the error CPU may be brought offline, and at least two other CPUs may enter the lockstep mode to continue running. Alternatively, in another possible manner, the RAS node corresponding to the comparator may be used to determine which CPU has an error and which type of error occurs, and then determine, according to the type of the error, whether to perform recovery on the CPU in which the error occurs.

405: The health monitoring module performs system health monitoring.

Specifically, the health monitoring module may bring the error CPU offline, or control all CPUs in the lockstep CPU to stop running. For example, in an automatic driving scenario, the health monitoring module may notify a system of exiting an automatic driving module, so that a micro controller unit (MCU) takes over to perform emergency braking.

406: Perform recovery by using the software.

Specifically, because the context of the correct CPU is flushed from the L1/L2 cache to the memory at the entry of the exception vector table, in this case, the context of the correct CPU may be recovered into the error CPU, to perform recovery on the error CPU.

It should be noted that software repair is usually used in a register at a common level, for example, an EL0-level register in an ARM64 architecture, an E1-level register, a RING0-level register in an X86 architecture, or a RING3-level register. Generally, an error permission level of the CPU in which the error occurs may be determined by performing the error query in step 404.

407: Recover the error CPU by using the hardware channel.

Figure 7:
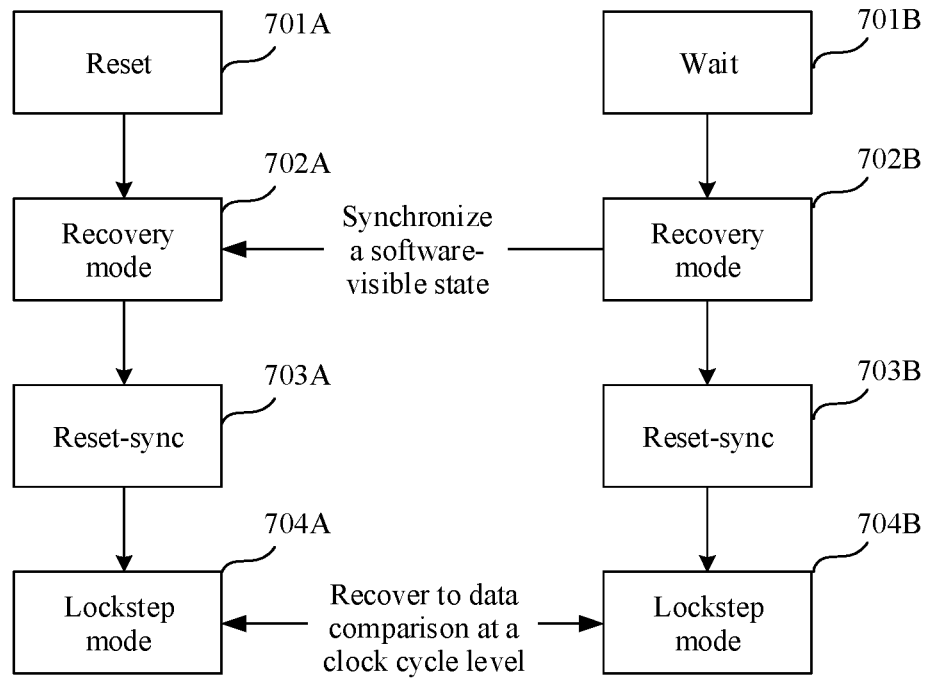
FIG. 7 shows an example of error correction based on a hardware channel according to an embodiment of this application.

Specifically, the error CPU may be synchronized according to a state of the correct CPU. In this case, the correct CPU may synchronize, through the hardware channel between the correct CPU and the error CPU, the software-visible CPU context of the correct CPU to the error CPU. FIG. 7 shows an example of error correction based on a hardware channel according to an embodiment of this application.

For the error CPU, 701A to 704A are performed, and for the correct CPU, 701B to 704B are performed.

701A: Reset the error CPU, that is, reset a microarchitecture state of the CPU, to perform single-core recovery of the error CPU. Herein, the single-core recovery means that recovery is performed on the error CPU, but recovery is not performed on the correct CPU.

702A: After the single-core recovery, the error CPU enters a recovery mode, and notifies the correct CPU of entering the recovery mode at the same time. As an example, the error CPU may notify, in an interrupt manner or in another manner, the correct CPU of entering the recovery mode. This is not limited in this embodiment of this application.

In addition, in the recovery mode, the error CPU may obtain a software-visible state of the correct CPU by using the hardware channel, and perform recovery according to the software-visible state of the correct CPU. As an example, the hardware channel may be a data channel between the correct CPU and the error CPU.

703A: After the state of the error CPU is recovered, the error CPU and the correct CPU enter a reset-sync state at the same time. For 703A, refer to the description of 408.

704A: After the reset-sync is completed, all CPUs participating in the lockstep re-enter the lockstep mode. For 704A, refer to the description of 409.

701B: When the error CPU is reset, the correct CPU is in a spin wait state. In the spin wait state, the correct CPU waits for notification from the error CPU of entering the recovery mode. As an example, the error CPU may notify, in an interrupt manner or in another manner, the correct CPU of entering the mode. This is not limited in this embodiment of this application.

702B: After entering the recovery mode, the correct CPU sends a software-visible state in a register of the correct CPU to the error CPU by using the hardware channel, to perform recovery on the error CPU.

703B: After transmission of the software-visible state is completed, the correct CPU and the error CPU enter the reset-sync state at the same time. For 703B, refer to the description of 408.

704B: After the reset-sync is completed, all CPUs participating in the lockstep re-enter the lockstep mode. For 704B, refer to the description of 409.

It should be noted that in some special cases, that an error occurs in a register at which level is unknown, for example, a system suspension. In this case, registers of all levels can be repaired in a hardware channel-based manner. In this case, because a quantity of registers that need to be recovered is large, a recovery speed is slower than that of software recovery.

408: Enter the reset-sync.

After a software-visible state inside an error CPU core is recovered, the correct CPU performs the reset-sync, that is, resets an internal microarchitecture. In a possible implementation, an error CPU resets all software-invisible hardware states, clears data in a CPU cache, and reserves software-visible states in the system register and the general register. Based on this, the reset-sync is different from conventional CPU reset, and the reset-sync is not complete reset. Therefore, a required time is relatively short, for example, may be dozens of CPU clock cycles.

In an embodiment, after the at least two CPUs are reset, an initialization instruction may be executed to recover a software-visible CPU context, so that the at least two CPUs re-enter the lockstep mode, where the initialization instruction includes a software-visible CPU context of the second CPU at the time of triggering the interrupt, and is used to recover a software-visible CPU context of the first CPU to the software-visible CPU context of the second CPU at the time of triggering the interrupt, and the CPU context includes a value of a system register and a value of a general purpose register. In an implementation, the initialization instruction may be executed by an initialization unit.

In a possible embodiment, the at least two CPUs participating in the lockstep are reset to a position at which the software pre-places an initialization instruction, where the initialization instruction includes a CPU PC pointer and a system register (namely, a value of the system register or data) of the foregoing correct CPU at an interrupt moment. After the resetting, the at least two CPUs execute the initialization instruction at the same time.

Before the reset-sync is performed, the software-visible states set by the at least two physical CPUs are completely the same. After the reset-sync is performed, the software-visible states of the at least two physical CPUs are still the same, and the at least two CPUs obtain data and an instruction from the external memory and receive a same input instruction stream.

409: The lockstep CPU continues to run at a previous exit position.

After the reset-sync is performed, in one case, microarchitecture states of all CPUs participating in the lockstep each are an initial state after the resetting. The software-visible state is a state before a service is interrupted. In another case, all CPUs participating in the lockstep execute the initialization instruction at the same time, and therefore the lockstep CPU can continue to run from a position at which a service program is interrupted previously.

In addition, the comparator corresponding to the lockstep CPU continues to perform cycle-by-cycle comparison on the at least two physical CPUs in the lockstep CPU.

Therefore, in the embodiments of this application, the at least two CPUs in the lockstep mode can exit the lockstep mode when an error occurs in at least one CPU, and the CPU in which the error occurs and a CPU that runs normally are determined. Based on this, when the error can be recovered, the CPU in which the error occurs can be recovered based on a CPU that runs normally. This helps the at least two CPUs run again at a position at which a service program is interrupted. Therefore, in the embodiments of this application, an error recovery capability of a lockstep system can be improved, and system reliability can be improved.

Figure 8:
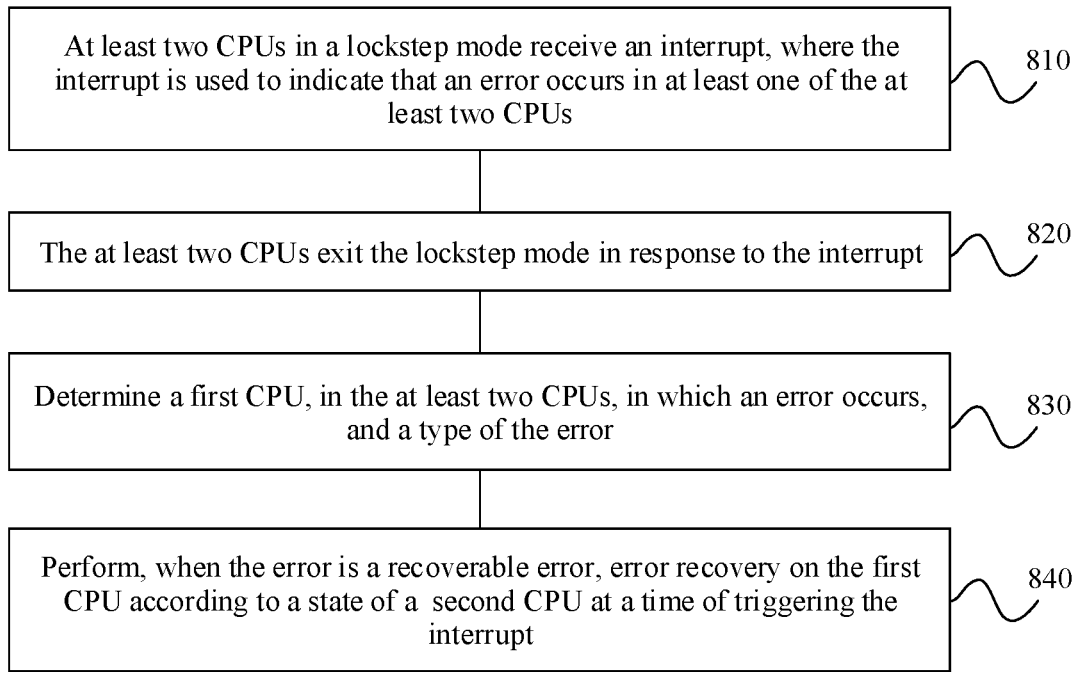
FIG. 8 is a schematic flowchart of an error recovery method according to an embodiment of this application.

FIG. 8 is a schematic flowchart of an error recovery method according to an embodiment of this application. As an example, the method may be performed by the system shown in FIG. 1 or FIG. 2. The method includes 810 to 830.

810: At least two CPUs in a lockstep mode receive an interrupt, where the interrupt is used to indicate that an error occurs in at least one of the at least two CPUs.

820: The at least two CPUs exit the lockstep mode in response to the interrupt.

830: Determine a first CPU, in the at least two CPUs, in which an error occurs, and a type of the error.

840: When the error is a recoverable error, perform error recovery on the first CPU according to a state of a correctly running second CPU in the at least two CPUs at a time of triggering the interrupt.

Therefore, in the embodiments of this application, the at least two CPUs in the lockstep mode can exit the lockstep mode when an error occurs in at least one CPU, and the CPU in which the error occurs and the type of the error are determined. Based on this, when the error can be recovered, the CPU in which the error occurs can be recovered based on a CPU that runs normally. This helps the at least two CPUs run again at a position at which a service program is interrupted. Therefore, in the embodiments of this application, an error recovery capability of a lockstep system can be improved, and system reliability can be improved.

It should be noted that there may be one or more first CPUs and one or more second CPUs.

As an example, a state of the CPU may include a software-visible state and/or a software-invisible hardware state of the CPU. The software-visible state, also referred to as a CPU context, includes a value (or data) of a general purpose register and a value (or data) of a system register. The software-invisible hardware state may also be referred to as a software-invisible microarchitecture state, and may be executed on the processor.

In a possible embodiment, the at least two CPUs stop running when the error is an unrecoverable error.

In some embodiments, the performing error recovery on the first CPU according to a state of the correctly running second CPU in the at least two CPUs at the time of triggering interrupt includes:

obtaining, from a memory, a software-visible CPU context of the second CPU at the time of triggering the interrupt, and updating, according to the software-visible CPU context of the second CPU, a software-visible CPU context of the first CPU, where the CPU context includes a value of a system register and a value of a general purpose register.

In some embodiments, the second CPU is further configured to save the software-visible CPU context of the second CPU and data in a cache at the time of triggering the interrupt to the memory. Optionally, the first CPU may save the software-visible CPU context of the first CPU and data in a cache at the time of triggering the interrupt to the memory.

In some embodiments, the performing error recovery on the first CPU according to a state of the correctly running second CPU in the at least two CPUs at the time of triggering interrupt includes:

obtaining, through a hardware channel between the first CPU and the second CPU, a software-visible CPU context of the second CPU at the time of triggering the interrupt, and updating, according to the software-visible CPU context of the second CPU, a software-visible CPU context of the first CPU, where the CPU context includes a value of a system register and a value of a general purpose register.

It should be noted that in some special cases, that an error occurs in a register at which level is unknown, for example, a system suspension. In this case, registers of all levels can be repaired in a hardware channel-based manner.

In some embodiments, the method further includes: after the software-visible CPU context of the first CPU is updated, respectively resetting software-invisible microarchitecture states of the first CPU and the second CPU, and retaining the respective software-visible CPU context, so that the first CPU and the second CPU re-enter the lockstep mode. In other words, an error CPU resets all software-invisible hardware states, clears data in a CPU cache, and reserves software-visible states in the system register and the general register.

Therefore, before the resetting, software-visible states set by the at least two CPUs are completely the same. After the resetting, software-visible states of the at least two CPUs are still the same, and the at least two CPUs obtain data and an instruction from the external memory and receive a same input instruction stream.

In some embodiments, the performing error recovery on the first CPU according to a state of the correctly running second CPU in the at least two CPUs at the time of triggering interrupt includes:

respectively resetting the first CPU and the second CPU, and executing an initialization instruction to recover a software-visible CPU context, so that the first CPU and the second CPU re-enter the lockstep mode, where the initialization instruction includes a software-visible CPU context of the second CPU at the time of triggering the interrupt, and is used to recover a software-visible CPU context of the first CPU to the software-visible CPU context of the second CPU at the time of triggering the interrupt, and the CPU context includes a value of a system register and a value of a general purpose register.

Therefore, before the resetting, software-visible states set by the at least two CPUs are completely the same. After the resetting, software-visible states of the at least two CPUs are still the same, and the at least two CPUs obtain data and an instruction from the external memory and receive a same input instruction stream.

In some embodiments, the determining a first CPU, in the at least two CPUs, in which an error occurs, and a type of the error includes:

determining, by the first CPU, the type of the error according to an advanced configuration and power management interface ACPI table corresponding to the first CPU, where the ACPI table is used to record an error found when a status register of a reliability, availability, and serviceability RAS node of a CPU is polled. In this way, when an RAS error occurs in the CPU, the CPU is interrupted, or the system is abnormal and enters an UEFI or a BIOS. The UEFI or the BIOS traverses status registers of all RAS nodes, and records an error corresponding to the CPU in a memory table (namely, the APCI table). Therefore, an ACPI driver of an operating system can parse the table to know which node in the system has an error of which type.

Alternatively, the first CPU polls a status register of an RAS node of the first CPU, to determine the type of the error. In this way, when an RAS error occurs in the CPU, the CPU is interrupted, or the system is abnormal. In this case, an RAS driver directly traverses status registers of all RAS nodes in sequence, to determine a cause of the error, instead of obtaining the cause by querying the ACPI table.

In an embodiment, the second CPU may further poll a status register of an RAS node of the second CPU, to determine that the second CPU runs normally.

In an embodiment, the second CPU may further determine, according to an ACPI table corresponding to the second CPU, that the second CPU runs normally.

In an embodiment, when the at least two CPUs enter the split mode, each CPU may determine whether an error occurs in the CPU, and does not need to query the RAS node or the ACPI table. In other words, in this case, that which CPU is a CPU in which an error occurs and which CPU is a CPU that runs normally may be directly determined.

In some embodiments, the receiving, by at least two CPUs, an interrupt includes:

receiving, by the at least two CPUs, the interrupt sent by an interrupt controller, and the interrupt controller sends the interrupt to the at least two CPUs when a comparator circuit determines that outputs of the at least two CPUs are inconsistent.

In some embodiments, the outputs of the at least two CPUs include at least one of an internal bus output of each of the at least two CPUs, an external bus output of each of the at least two CPUs, and an L3 cache control logic output of each of the at least two CPUs.

In some embodiments, the determining a first CPU, in the at least two CPUs, in which an error occurs, and a type of the error includes:

querying a status register of an RAS node corresponding to the comparator circuit to determine the first CPU, in the at least two CPUs, in which the error occurs and the type of the error.

In this case, when the comparator determines that the obtained outputs of the CPUs are inconsistent, an RAS interrupt may be reported, and information about inconsistent data of the comparison is provided in a register of an RAS node corresponding to the comparator, for example, at least one of an error data address, an error module, and an error type.

The error recovery method shown in FIG. 8 can implement each process of the error recovery method corresponding to the foregoing method embodiment. For details, refer to the foregoing descriptions. To avoid repetition, details are not described herein again.

The foregoing describes in detail the error recovery method in the embodiments of this application with reference to FIG. 1 to FIG. 8. The following describes in detail an error recovery apparatus in the embodiments of this application with reference to FIG. 9. It should be understood that the error recovery apparatus in FIG. 9 can perform the steps of the error recovery method in the embodiments of this application. When the error recovery apparatus shown in FIG. 9 is described below, repeated descriptions are properly omitted.

Figure 9:
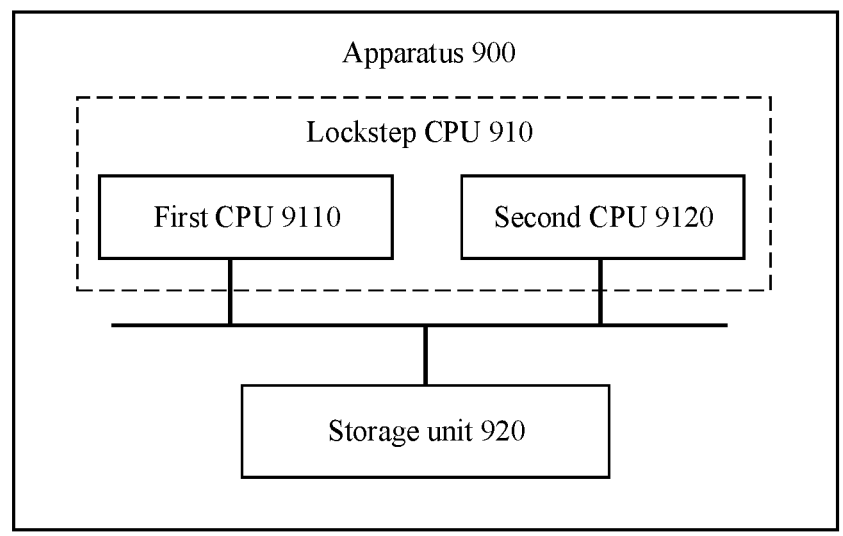
FIG. 9 is a schematic flowchart of an error recovery apparatus according to an embodiment of this application.

FIG. 9 is a schematic block diagram of an error recovery apparatus 900 according to an embodiment of this application.

The apparatus 900 shown in FIG. 9 includes a lockstep CPU 910, and the lockstep CPU 910 includes a first CPU 9110 and a second CPU 9120.

The first CPU 9110 is configured to: receive an interrupt, where the interrupt is triggered by an error that occurs in the first CPU 9110 when the first CPU 9110 and the second CPU 9120 are in a lockstep mode;

exit the lockstep mode in response to the interrupt, and determine a type of the error; and when the error is a recoverable error, perform error recovery according to a state of the second CPU 9120 at the time of triggering the interrupt.

The second CPU 9120 is configured to receive the interrupt and exit the lockstep mode.

In some embodiments, the first CPU 9110 is specifically configured to:

obtain, from a memory, a software-visible CPU context of the second CPU 9120 at the time of triggering the interrupt, and update, according to the software-visible CPU context of the second CPU 9120, a software-visible CPU context of the first CPU 9110, where the CPU context includes a value of a system register and a value of a general purpose register.

In some embodiments, the second CPU 9120 is further configured to save the software-visible CPU context of the second CPU 9120 and data in a cache at the time of triggering the interrupt to the memory.

In some embodiments, the first CPU 9110 is specifically configured to:

obtain, through a hardware channel between the first CPU 9110 and the second CPU 9120, a software-visible CPU context of the second CPU 9120 at the time of triggering the interrupt, and update, according to the software-visible CPU context of the second CPU 9120, a software-visible CPU context of the first CPU 9110, where the CPU context includes a value of a system register and a value of a general purpose register.

In some embodiments, the first CPU 9110 is further configured to: after the software-visible CPU context is updated, reset a software-invisible microarchitecture state of the first CPU 9110, and retain the software-visible CPU context of the first CPU 9110, so that the first CPU 9110 re-enters the lockstep mode; and the second CPU 9120 is further configured to: after the software-visible CPU context of the first CPU 9110 is updated, reset a software-invisible microarchitecture state of the second CPU 9120, and retain the software-visible CPU context of the second CPU 9120, so that the second CPU 9120 re-enters the lockstep mode.

In some embodiments, the first CPU 9110 is specifically configured to be reset, and after the resetting, is specifically configured to execute an initialization instruction to recover a software-visible CPU context, so that the first CPU 9110 re-enters the lockstep mode, where the initialization instruction includes a software-visible CPU context of the second CPU 9120 at the time of triggering the interrupt, and the initialization instruction is used to recover a software-visible CPU context of the first CPU 9110 to the software-visible CPU context of the second CPU 9120 at the time of triggering the interrupt, where the CPU context includes a value of a system register and a value of a general purpose register.

The second CPU 9120 is specifically configured to be reset, and after the resetting, is specifically configured to execute the initialization instruction, so that the second CPU 9120 re-enters the lockstep mode.

In some embodiments, the first CPU and the second CPU may be reset at the same time, and execute the initialization instruction at the same time, so that the first CPU and the second CPU re-enter the lockstep mode.

In some embodiments, the first CPU 9110 is specifically configured to:

determine the type of the error according to an advanced configuration and power management interface ACPI table corresponding to the first CPU 9110, where the ACPI table is used to record an error found when a status register of a reliability, availability, and serviceability RAS node of a CPU is polled; or poll a status register of an RAS node of the first CPU 9110, to determine the type of the error.

In some embodiments, the first CPU 9110 is specifically configured to receive the interrupt sent by an interrupt controller, where the interrupt controller sends the interrupt to the first CPU 9110 and the second CPU 9120 when a comparator circuit determines that outputs of the first CPU 9110 and the second CPU 9120 are inconsistent.

The second CPU 9120 is specifically configured to receive the interrupt sent by the interrupt controller.

In some embodiments, the first CPU 9110 is further configured to:

query a status register of an RAS node corresponding to the comparator circuit to determine the first CPU 9110 in which the error occurs and the type of the error.

In some embodiments, the first CPU 9110 and the second CPU 9120 further stop running when the error is an unrecoverable error.

In some embodiments, the apparatus 900 may further include the interrupt controller and the comparison circuit.

The comparator circuit is configured to obtain outputs of the first CPU 9110 and the second CPU 9120, and send a first signal to the interrupt controller when determining that the outputs of the first CPU 9110 and the second CPU 9120 are inconsistent, where the first signal is used to indicate the interrupt controller to send an interrupt to the first CPU 9110 and the second CPU 9120.

The interrupt controller sends the interrupt to the first CPU 9110 and the second CPU 9120 according to the first signal.

In an embodiment, the system may further include a storage unit 920. In a possible manner, the storage unit 920 is configured to store an instruction. Optionally, the storage unit 920 may also be configured to store data or information. The storage unit 920 may be implemented by using a memory.

In a possible embodiment, the first CPU 9110 and the second CPU 9120 may be configured to execute the instruction stored in the storage unit 920, so that the apparatus 900 implements the foregoing error recovery method.

Further, the first CPU 9110, the second CPU 9120, and the storage unit 920 may communicate with each other by using an internal connection path, to transfer a control signal and/or a data signal. For example, the storage unit 920 is configured to store a computer program, and the first CPU 9110 and the second CPU 9120 may be configured to invoke the computer program from the storage unit 920 and run the computer program, to complete the foregoing error recovery method. The storage unit 920 may be integrated into the lockstep CPU 910, or may be disposed separately from the lockstep CPU 910.

The memory may be one or more of the following types: a flash memory, a hard disk type memory, a micro multimedia card memory, a card memory (for example, an SD or an XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disc. For example, the memory may store a computer program (the computer program is a program corresponding to the error recovery method in the embodiments of this application). When the processing unit executes the computer program, the processing unit can perform the error recovery method in the embodiments of this application.

The memory further stores data other than the computer program. For example, the memory may store data in a processing process of the error recovery method in this application.

The apparatus 900 shown in FIG. 9 can implement each process of the error recovery method corresponding to the foregoing method embodiment. Specifically, for the apparatus 900, refer to the foregoing descriptions. To avoid repetition, details are not described herein again.

Figure 10:
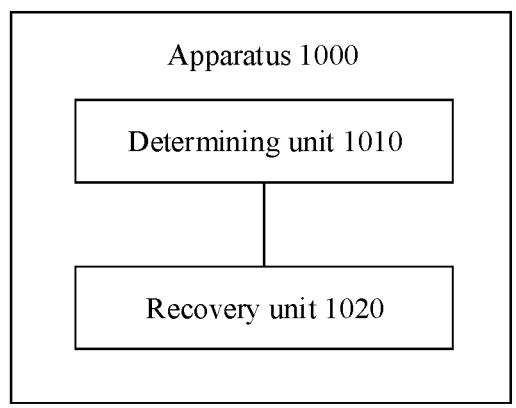
FIG. 10 is a schematic flowchart of an error recovery apparatus according to an embodiment of this application.

FIG. 10 is a schematic block diagram of an error recovery apparatus 1000 according to an embodiment of this application. The apparatus 1000 includes a determining unit 1010 and a recovery unit 1020.

When an error occurs in a first CPU in at least two central processing units CPUs that are in a lockstep mode, and when the at least two CPUs exit the lockstep mode, the determining unit 1010 is configured to determine a type of the error in the first CPU; and the recovery unit 1020 is configured to perform, when the error is a recoverable error, error recovery on the first CPU according to a state of the correctly running second CPU in the at least two CPUs at a time of triggering an interrupt.

In some embodiments, the recovery unit 1020 is specifically configured to:

obtain, from a memory, a software-visible CPU context of the second CPU at the time of triggering the interrupt, and update, according to the software-visible CPU context of the second CPU, a software-visible CPU context of the first CPU, where the CPU context includes a value of a system register and a value of a general purpose register.

In some embodiments, the apparatus further includes a CPU context management unit. The CPU context management unit is configured to save the software-visible CPU context of the second CPU and data in a cache at the time of triggering the interrupt to the memory.

In some embodiments, the apparatus further includes an initialization unit. The initialization unit is configured to: after the first CPU and the second CPU are reset, execute an initialization instruction to recover a software-visible CPU context, so that the first CPU and the second CPU re-enter the lockstep mode, where the initialization instruction includes a software-visible CPU context of the second CPU at the time of triggering the interrupt, and is used to recover the software-visible CPU context of the first CPU to the software-visible CPU context of the second CPU at the time of triggering the interrupt, and the CPU context includes a value of a system register and a value of a general purpose register.

In some embodiments, the determining unit 1010 is specifically configured to:

determine the type of the error according to an advanced configuration and power management interface ACPI table corresponding to the first CPU, where the ACPI table is used to record an error found when a status register of a reliability, availability, and serviceability RAS node of a CPU is polled; or poll a status register of an RAS node of the first CPU, to determine the type of the error.

In some embodiments, the determining unit 1010 is specifically configured to:

query a status register of an RAS node corresponding to the comparator circuit, to determine the first CPU in which the error occurs and the type of the error, where the comparator circuit is configured to send a first signal to an interrupt controller when determining that outputs of the at least two CPUs are inconsistent, and the first signal is used to indicate the interrupt controller to send an interrupt to the at least two CPUs to trigger the at least two CPUs to exit the lockstep mode.

In some embodiments, the outputs of the at least two CPUs include at least one of an internal bus output of each of the at least two CPUs, an external bus output of each of the at least two CPUs, and an L3 cache control logic output of each of the at least two CPUs.

In some embodiments, the determining unit 1010 is further configured to control the at least two CPUs to stop running when the error is an unrecoverable error.

The error recovery apparatus 1000 shown in FIG. 10 can implement a corresponding process of the error recovery method corresponding to the foregoing method embodiment. Specifically, for the error recovery apparatus 1000, refer to the foregoing descriptions. To avoid repetition, details are not described herein again.

As an example, the error recovery apparatus may be a terminal, or may be an apparatus (for example, a chip, or an apparatus that can match and be used by a terminal) that is in the terminal and that is configured to perform error recovery. The terminal may be specifically a smartphone, an in-vehicle apparatus, a wearable device, or the like. Optionally, the foregoing in-vehicle apparatus may be a computer system that is independent of an automobile but that can be applied to the automobile, or may be a computer system integrated into an automobile (for example, a self-driving automobile).

An embodiment of this application further provides a computer-readable storage medium. The computer-readable storage medium stores program code, and the program code includes an instruction used to perform some or all operations in the method according to any one of the foregoing embodiments.

In an embodiment, the computer-readable storage medium is located in a terminal, and the terminal may be an apparatus that can perform error recovery.

An embodiment of this application further provides a computer program product. When the computer program product runs on an error recovery apparatus, the error recovery apparatus performs some or all of the operations in the method according to any one of the foregoing embodiments.

An embodiment of this application further provides a chip. The chip includes a processor, and the processor is configured to perform some or all operations in the method according to any one of the foregoing embodiments.

The embodiments in this application may be separately or jointly used. This is not limited herein.

It should be understood that descriptions such as "first" and "second" in the embodiments of this application are merely used for indicating and distinguishing between described objects, do not show a sequence, do not indicate that a quantity of devices is specifically limited in the embodiments of this application, and cannot constitute any limitation on the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A lockstep system, comprising:
   a first central processing unit (CPU);
   a second CPU;
   an interrupt controller; and
   a comparison circuit configured to:
      determine that outputs of the first CPU and the second CPU are inconsistent when the first CPU and the second CPU are operating in a lockstep mode, and send a first signal to the interrupt controller according to the inconsistent outputs of the first CPU and the second CPU;
   wherein the interrupt controller is configured to send an interrupt to the first CPU and the second CPU in response to the first signal, and the interrupt is used to indicate that an error occurs in at least one of the first CPU and the second CPU, and
   wherein the first CPU and the second CPU exit the lockstep mode and operate in a split mode in response to the interrupt.

2. The lockstep system according to claim 1, wherein the outputs of the first CPU and the second CPU include at least one of an internal bus output of each of the first CPU and the second CPU, an external bus output of each of the first CPU and the second CPU, or an L3 cache control logic output of first CPU and the second CPU.

3. The lockstep system according to claim 1, wherein the comparison circuit is a comparison circuit at a CPU clock cycle level.

4. The lockstep system according to claim 1, wherein the comparison circuit shares a clock source with the first CPU and the second CPU when the first CPU and the second CPU are operating in the lockstep mode.

5. The lockstep system according to claim 1, wherein the first CPU comprises a primary CPU and at least one secondary CPU.

6. The lockstep system according to claim 5, wherein the comparison circuit comprises:
   a CPU internal output comparator configured to compare an internal bus output of the primary CPU with an internal bus output of the at least one secondary CPU;
   a CPU external output comparator configured to compare an external bus output of the primary CPU with an external bus output of the at least one secondary CPU; and an L3 cache control logic output comparator configured to compare an L3 cache control logic output (L3_CTRL0) of the primary CPU with an L3 cache control logic output (L3_CTRL0') of the at least one secondary CPU.

7. A method for recovering errors, comprising:
determining, by a comparison circuit, that outputs of a first central processing unit (CPU) and a second CPU are inconsistent when the first CPU and the second CPU are operating in a lockstep mode;
sending, by the comparison circuit, a first signal to an interrupt controller according to the inconsistent outputs of the first CPU and the second CPU;
sending, by the interrupt controller, an interrupt to the first CPU and the second CPU in response to the first signal, wherein the interrupt is used to indicate that an error occurs in at least one of the first CPU and the second CPU, and
exiting, by the first CPU and the second CPU, the lockstep mode and operating in a split mode in response to the interrupt.

8. The method according to claim 7, wherein the outputs of the first CPU and the second CPU include at least one of an internal bus output of each of the first CPU and the second CPU, an external bus output of each of the first CPU and the second CPU, or an L3 cache control logic output of first CPU and the second CPU.

9. The method according to claim 7, wherein the comparison circuit is a comparison circuit at a CPU clock cycle level.

10. The method according to claim 7, wherein the comparison circuit shares a clock source with the first CPU and the second CPU when the first CPU and the second CPU are operating in the lockstep mode.

11. The method according to claim 7, wherein the first CPU comprises a primary CPU and at least one secondary CPU.

12. The method according to claim 11, further comprising:
comparing an internal bus output of the primary CPU with an internal bus output of the at least one secondary CPU;
comparing an external bus output of the primary CPU with an external bus output of the at least one secondary CPU; and
comparing an L3 cache control logic output (L3_CTRL0) of the primary CPU with an L3 cache control logic output (L3_CTRL0') of the at least one secondary CPU.

* * * * *